(Model.)
J. W. FOSTER.
DEVICE FOR SUPPORTING CRANK SHAFTS AND BALANCE WHEELS OF SEWING MACHINES.
No. 247,186. Patented Sept. 20, 1881.
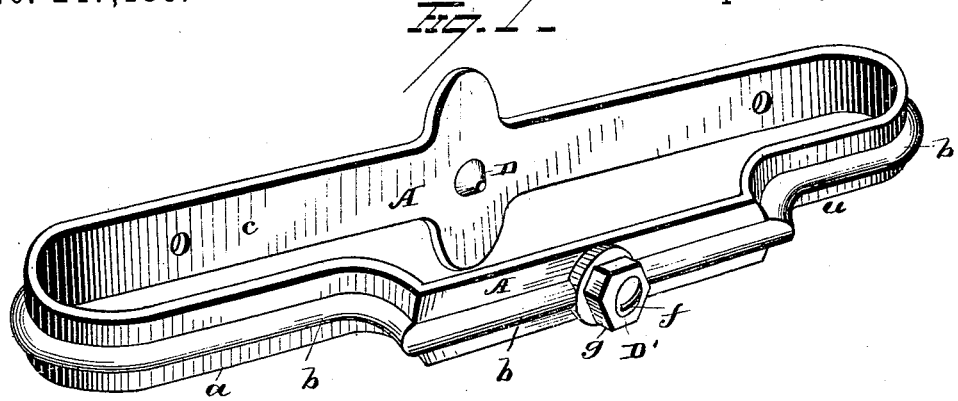
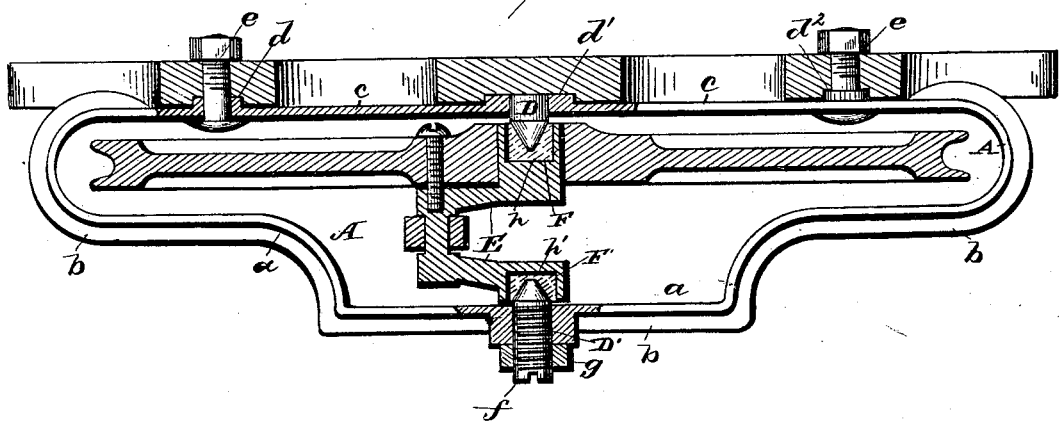
WITNESSES
INVENTOR
John W. Foster,
By H. A. Seymour,
ATTORNEY

UNITED STATES PATENT OFFICE.

JOHN W. FOSTER, OF NORWALK, OHIO, ASSIGNOR OF ONE-HALF TO THE DAUNTLESS MANUFACTURING COMPANY, OF SAME PLACE.

DEVICE FOR SUPPORTING CRANK-SHAFTS AND BALANCE-WHEELS OF SEWING-MACHINES.

SPECIFICATION forming part of Letters Patent No. 247,186, dated September 20, 1881.

Application filed July 22, 1881. (Model.)

To all whom it may concern:

Be it known that I, JOHN WHITBECK FOSTER, of Norwalk, in the county of Huron and State of Ohio, have invented certain new and useful Improvements in Devices for Supporting the Crank-Shafts and Balance-Wheels of Sewing-Machines, Lathes, &c.; and I do hereby declare the following to be a full, clear, and exact description of the invention, such as will enable others skilled in the art to which it pertains to make and use it, reference being had to the accompanying drawings, which form part of this specification.

My invention relates to an improvement in devices for supporting the crank-shafts and balance-wheels of sewing-machines, lathes, &c., the object being to provide simple and efficient means for supporting the crank-shaft and balance-wheel, the parts to be so constructed and arranged that the wear of the journal or bearing may be readily compensated for; and with these ends in view my invention consists in certain features of construction and combinations of parts, as will hereinafter be described, and pointed out in the claims.

In the accompanying drawings, Figure 1 is a view, in perspective, of the supporting-loop, and Fig. 2 is a view, partly in plan and partly in section, of the loop, balance-wheel, and crank secured in place.

A represents a supporting-loop, which is made in a single continuous piece and preferably made of cast-iron. Its front portion, $a$, may be provided with a strengthened rib, $b$, as shown, or it may be plain. The rear side, $c$, has three lugs, $d\ d'\ d^2$, cast thereon, said lugs being inserted in corresponding sockets in the sewing-machine frame, thereby serving to retain the loop against displacement and relieve the fastening-screws $e$ of undue strain and weight.

In the central portion of the rear side, $c$, of the loop is rigidly secured a conical bearing, D, while the front portion, $a$, is provided with an adjustable conical bearing, D', the same consisting of a screw, $f$, and a set-nut, $g$. By loosening the latter the conical bearing D' may be turned in either direction, and when in proper adjustment it is secured by the set-nut $g$. By forming the supporting-loop in one piece and securing it at points on opposite sides of its center to the sewing-machine frame the following advantages are secured: The conical bearings which support the crank E are always in perfect alignment, being secured within a single and solid piece of metal. This is a radical improvement on that type of devices long employed for supporting balance-wheels of sewing-machines, cutting-machines, and lathes, whereby one journal-bearing is secured to a bridge and the other to the machine-frame. A slight displacement of the bridge throws the two bearings out of alignment, and thus increases the friction and wear of parts and calls for an undue outlay of power to run the machine. Again, by the employment of a continuous loop it is adapted to be secured to the frame at opposite sides of the crank, and thus prevent any tendency to spring the frame as force is applied to the crank throughout the different portions of its revolution. Again, by the employment of a single continuous loop it may be of sufficient length to admit the balance or fly wheel and yet be adapted to be attached to a comparatively narrow frame—that is to say, fastening-screws are inserted through the sewing-machine frame and the loop on opposite sides of the crank, while the ends of the loop are allowed to extend outward a considerable distance beyond the front and rear edges of the frame, and thereby accommodate a balance-wheel of any desired diameter. The loop may be separated from the frame without disturbing the crank and balance-wheel.

The lugs on the loop may be dispensed with, if desired. The loop forms of itself a skeleton dress-guard on each side of the wheel, and from its forward portion a pendent dress-guard may be secured.

The crank E is provided with the two sockets $h\ h'$, which may be circular or of any angular form. Within the sockets $h\ h'$ are secured the rawhide plugs or bearings F F', each having a conical recess to receive the conical ends of the bearings D D'. The rawhide plugs will wear for a great length of time without renewal, and render the bearing practically noiseless. They may be readily renewed when unduly worn.

I do not restrict myself to the exact construction and arrangement of parts shown and described, as it is evident that slight changes in the form and arrangement of parts might be made without departing from the spirit of my invention.

Having fully described my invention, what I claim as new, and desire to secure by Letters Patent, is—

1. The combination, with the supporting-frame of a sewing-machine, of a single continuous loop formed of a single casting and provided with bearings for the crank-shaft of a fly-wheel, and adapted to be secured to the frame on opposite sides of the crank-shaft, substantially as set forth.

2. The combination, with the supporting-frame of a sewing-machine, of a loop made in a single continuous piece and formed of a single casting, said loop provided with conical bearings for the crank-shaft and having lugs on opposite sides of the crank-shaft bearings, said lugs adapted to enter sockets in the supporting-frame, substantially as set forth.

3. The combination, with the supporting-loop and balance-wheel, of the crank-shaft having sockets or pockets formed in its opposite ends and removable rawhide bearings located in said sockets, substantially as set forth.

In testimony that I claim the foregoing I have hereunto set my hand this 11th day of July, 1881.

JOHN WHITBECK FOSTER.

Witnesses:
N. S. C. PERKINS,
JOHN B. BERKLEY.